(12) United States Patent
Hawang (10) Patent No.: US 7,837,408 B2
(45) Date of Patent: Nov. 23, 2010

(54) BOARD FIXING MODULE (75) Inventor: James Hawang, Taipei (TW)

(73) Assignee: Kenmark Industrial Co., Ltd., Taipei (TW)

( * ) Notice: Subject to any disclaimer, the term of this patent is extended or adjusted under 35 U.S.C. 154(b) by 169 days.

(21) Appl. No.: 12/073,092

(22) Filed: Feb. 29, 2008

(65) Prior Publication Data
US 2009/0220299 A1 Sep. 3, 2009

(51) Int. Cl.
F16B 12/02 (2006.01)
(52) U.S. Cl. .................... 403/408.1; 403/243; 403/297; 403/DIG. 13; 411/46; 411/48
(58) Field of Classification Search ................. 403/240, 403/243, 297, 408.1, DIG. 11, DIG. 13; 411/45, 411/46, 47, 48
See application file for complete search history.

(56) References Cited

U.S. PATENT DOCUMENTS 4,840,523 A * 6/1989 Oshida ........................ 411/48
4,952,106 A * 8/1990 Kubogochi et al. ........... 411/48
5,085,545 A * 2/1992 Takahashi .................... 411/45
5,201,623 A * 4/1993 Benedetti et al. ............. 411/48
5,902,083 A * 5/1999 Hwang ........................ 411/48
6,048,147 A * 4/2000 Arisaka et al. ............... 411/48
6,454,503 B1 * 9/2002 Polic et al. ................... 411/45
7,413,367 B2 * 8/2008 Hawang ..................... 403/297

* cited by examiner

Primary Examiner—Michael P Ferguson
(74) Attorney, Agent, or Firm—Bacon & Thomas, PLLC (57) ABSTRACT A board fixing module fixes a board to a base body. The board fixing module includes: a fixing element embedded into the base body, a bottom portion passed through the board and a latch element latched with the fixing element, and a passing rod passed into the latch element for maintaining the latch condition of the latch element and the fixing element. The invention is characterized in that users simply need to press the passing rod inward to release the latch condition of the latch element and the fixing element in order to separate the board from the base body, and thus the invention achieves the effect of a convenient installation or dismount.

7 Claims, 10 Drawing Sheets

BOARD FIXING MODULE

BACKGROUND OF THE INVENTION

1. Field of the Invention

The present invention relates to a fixture for fixing a board to a base body, and more particularly to a board fixing module that provides an effective positioning effect and an convenient installation or dismount.

2. Description of the Related Art

As Do-It-Yourself (DIY) becomes increasingly popular, many large chain house maintenance stores are established, and many manufacturers constantly introduce various different consumer DIY products to the market and provide users a way of assembling furniture products such as bookshelves, combinational cabinets, and CD racks, etc. Since DIY products require no professional assemblers to go to a customer's house to assemble the products, therefore the DIY products generally come with a lower price and become increasingly more popular, and many DIY furniture use nails or screws for fixing a board onto a base body, and the board can be a tabletop or a partition of a combinational cabinet and the base body can be another piece of board, a table leg or a wall of a combinational cabinet.

Unlike professional assemblers, consumers may need to remove an incorrectly installed part and reinstall the part during the assembling process of DIY furniture. If the DIY furniture is assembled and fixed by nails, then it will be very difficult to reinstall the parts, or any reinstalling may damage the product easily. If the DIY furniture is assembled and fixed by screws, then it is necessary to reinstall the parts by repeatedly loosening and securing the screws, and thus the thread of the screw will be damaged. As a result, the DIY product incurs a higher cost and a less convenient assembling process.

In addition, many other DIY furniture products sold in the market provide a latch module for consumers to assemble the furniture by a simple snap-in action as disclosed in U.S. Pat. Nos. 5,211,519, 5,902,083, 6,048,147, 6,406,235 and 6,540,461.

To make it easy to securely assemble DIY furniture, most of the traditional latch devices usually come with a structural design featuring an easy installation but a difficult dismount, and thus the traditional latch devices cannot overcome the aforementioned shortcomings of uneasy to remove the wrongly installed parts and easy to damage the product.

Therefore, the inventor of the present invention developed a board fixing module that can be installed or dismounted easily without damaging the product.

SUMMARY OF THE INVENTION

In view of the shortcomings of the prior art, the inventor of the present invention based on years of experience in the related industry to conduct extensive researches and experiments, and finally developed a board fixing module in accordance with the present invention to overcome the shortcomings of the prior art.

Therefore, it is a primary objective of the present invention to provide a board fixing module, so that consumers can use the board fixing module for installing or dismounting a board of a DIY product with a base body easily to provide a convenient application.

To achieve the foregoing objective, the present invention provides a board fixing module comprising: a fixing element embedded into a first fixing hole of a base body; a bottom portion passed through a second fixing hole of a board and latched to a latch element of the fixing element; and a passing rod passed into the latch element for maintaining a latch condition of the latch element and the fixing element, wherein:

The fixing element is in the shape of a pipe and the middle of the fixing element includes a latch hole, and the depth of a first fixing hole on the base body is greater than the length of the fixing element, such that after the fixing element is embedded and fixed, a moving space with an internal diameter greater than the latch hole is defined at the bottom of the fixing element.

The latch element comes with a length greater than the length of the fixing element, an external diameter corresponding to the latch hole of the fixing element, and a middle axially penetrating the through hole of the latch element. The bottom portion has an external diameter greater than the diameter of the latch hole of the fixing element and a latch portion in the elastic claw-shaped, and the internal wall around the periphery of the through hole has an internal flange disposed at a position corresponding to the latch portion. When the latch element is passed through the second fixing hole of the board and the latch hole of the fixing element, the claw-shaped latch portion is elastically retracted. The latch portion is elastically extended when it is displaced into the moving space at the bottom of the fixing element.

The length of the passing rod is greater than the depth of the through hole, and the passing rod is passed into the through hole of the latch element, and the bottom portion has a protruding lump disposed at the internal flange corresponding to the internal wall of the through hole, such that when the protruding lump is aligned with the internal flange, the claw-shaped latch portion is restricted from being retracted, and the latch portion with an external diameter greater than the latch hole of the fixing element is maintained under the fixing element and cannot be taken out. Thus, the board can be fixed onto the base body by latching the latch element and the passing rod to the fixing element.

If it is necessary to remove the board, users simply need to press the passing rod down, such that after the protruding lump is passed through the internal flange of the latch element, the latch portion will resume its elastically retracted state, and the latch element can be removed from the latch hole of the fixing element to separate the board from the base body, so as to achieve the effect of a convenient installation or dismount.

Compared with the prior art, the present invention simply requires users to align the second fixing hole of the board with the fixing element on the base body when the board is fixed to the base body, and then pass the latch element through the second fixing hole and the fixing element, and finally pass the passing rod into the latch element, so as to latch the board with the fixing element through the latch element and fix the board onto the base body. More specifically, when it is necessary to remove the board, the user simply needs to press the passing rod to separate the board from the base body. Thus, the invention provides the effect of a convenient installation or dismount, and prevents the structure of the product from being damaged by repeated insulations and dismounts.

To make it easy for our examiner to understand the above and other objects, features and advantages of the present invention, we use preferred embodiments accompanied with the related drawings for the following detailed description of the invention.

DETAILED DESCRIPTION OF THE PREFERRED EMBODIMENTS

The above and other objects, features and advantages of the present invention will become apparent from the following detailed description taken with the accompanying drawings, wherein like elements are represented by the same numeral.

Figure 1:
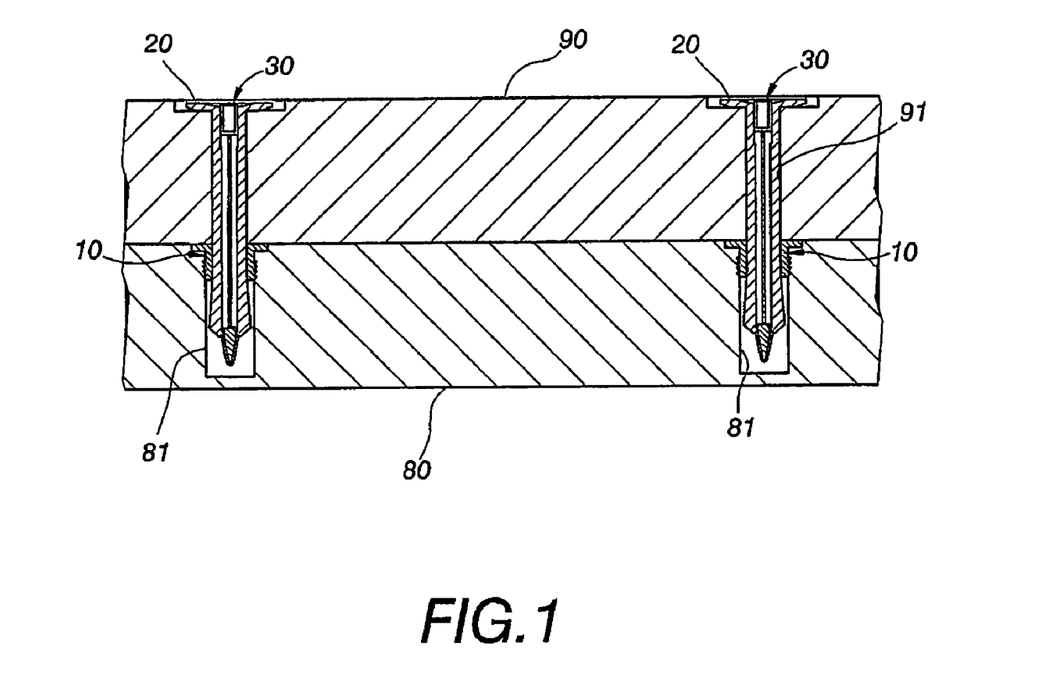
FIG. 1 is a schematic view of an assembly in accordance with the present invention.
Figure 2:
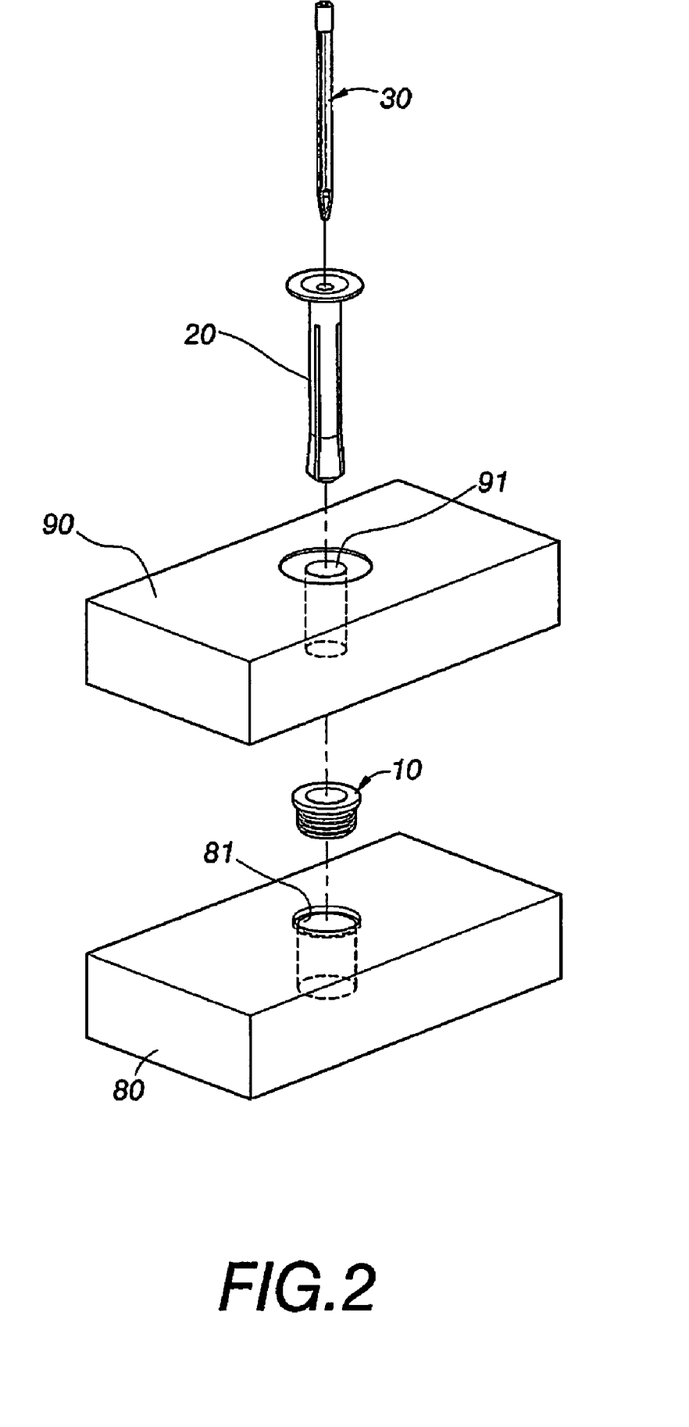
FIG. 2 is an exploded view of related parts of the present invention.
Figure 3:
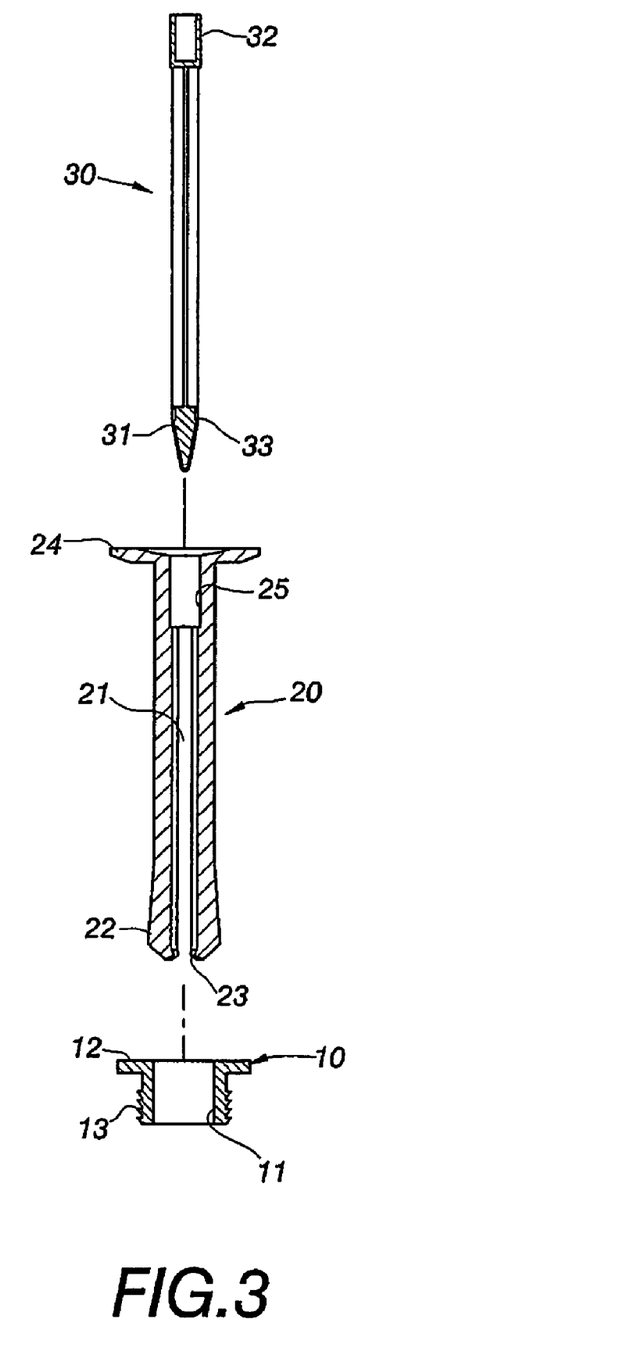
FIG. 3 is a schematic view of an assembly of a board fixing module in accordance with the present invention.
Figure 4:
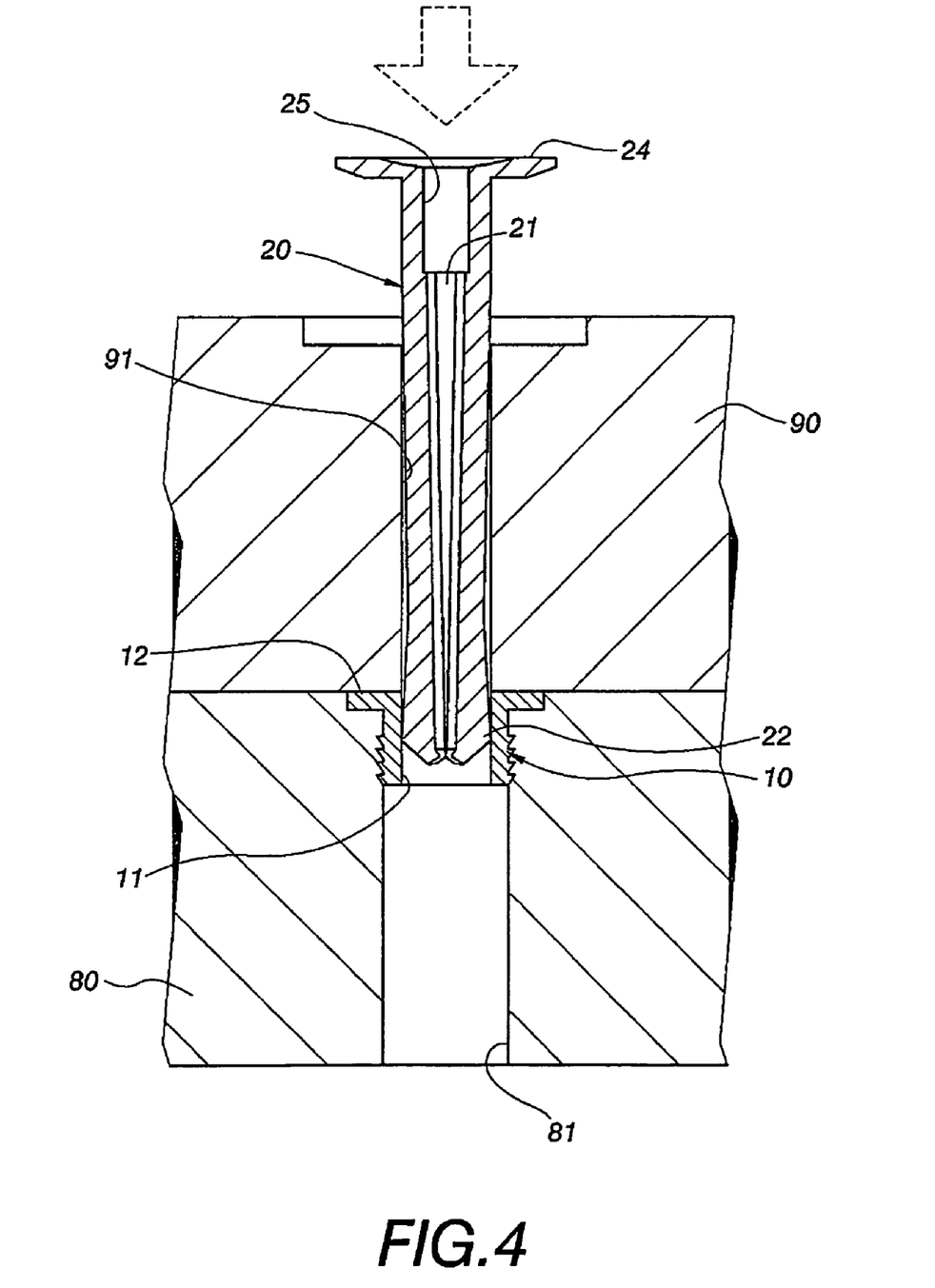
FIG. 4 is a schematic view of passing a latch element into a fixing element in accordance with the present invention.

In FIGS. 1 and 2, a board fixing module of the invention comprises: a fixing element 10 embedded into a first fixing hole 81 of a base: body 80; a bottom portion passed through a second fixing hole 91 of a board 90; a latch element 20 latched with the fixing element 10; and a passing rod 30 passed into the latch element 20 for maintaining a latch state of the latch element 20 and the fixing element 10, such that the board 90 can be latched to the fixing element 10 by the latch element 20 and the passing rod 30 and fixed onto the base body 80; wherein the board 90 can be a tabletop or a partition of a combinational cabinet, and the base body 80 can be another piece of board, a table leg or a wall of the combination cabinet, and the structures of the fixing element 10, the latch element 20 and the passing rod 30 are described in details as follows:

In FIGS. 3 and 4, the middle of the fixing element 10 includes a latch hole 11, and the length of the fixing element 10 is smaller than the depth of a first fixing hole 81 on the base body 80, such that after the fixing element 10 is embedded and fixed, the first fixing hole 81 forms a moving space under the fixing element 10 and having an internal diameter greater than the diameter of the latch hole 11.

To fix the fixing element 10 to the first fixing hole 81 securely, a stop board 12 is extended outward from the periphery around the top of the fixing element 10 for preventing the fixing element 10 from dropping out. The external rim of the fixing element 10 includes a plurality of serrations 13 for latching the internal periphery of the first fixing hole 81 to prevent the fixing element 10 from falling out from the top. In the embodiment, a plastic material is coated onto a contact surface between the external periphery of the fixing element 10 and the internal periphery of the first fixing hole 81 to enhance the strength of fixing the fixing element 10 with the first fixing hole 81.

The latch element 20 comes with a length greater than the length of the fixing element 10, and an external diameter corresponding to the latch hole 11 of the fixing element 10. The middle of the latch element 20 includes a through hole 21 axially penetrating the latch element 20, and the bottom portion comes with an external diameter greater than the diameter of the latch hole 11 of the fixing element 10 and includes an elastic claw-shaped latch portion 22. The internal wall around the through hole 21 at the bottom portion includes an internal flange 23 disposed at a position corresponding to the latch portion 22.

To prevent the latch element 20 from dropping out after the latch element 20 is passed through the second fixing hole 91 of the board 90, wherein the latch element 20 has a nut rim 24 disposed around the top of the latch element 20 and having an external diameter greater than the diameter of the second fixing hole 91.

Figure 5:
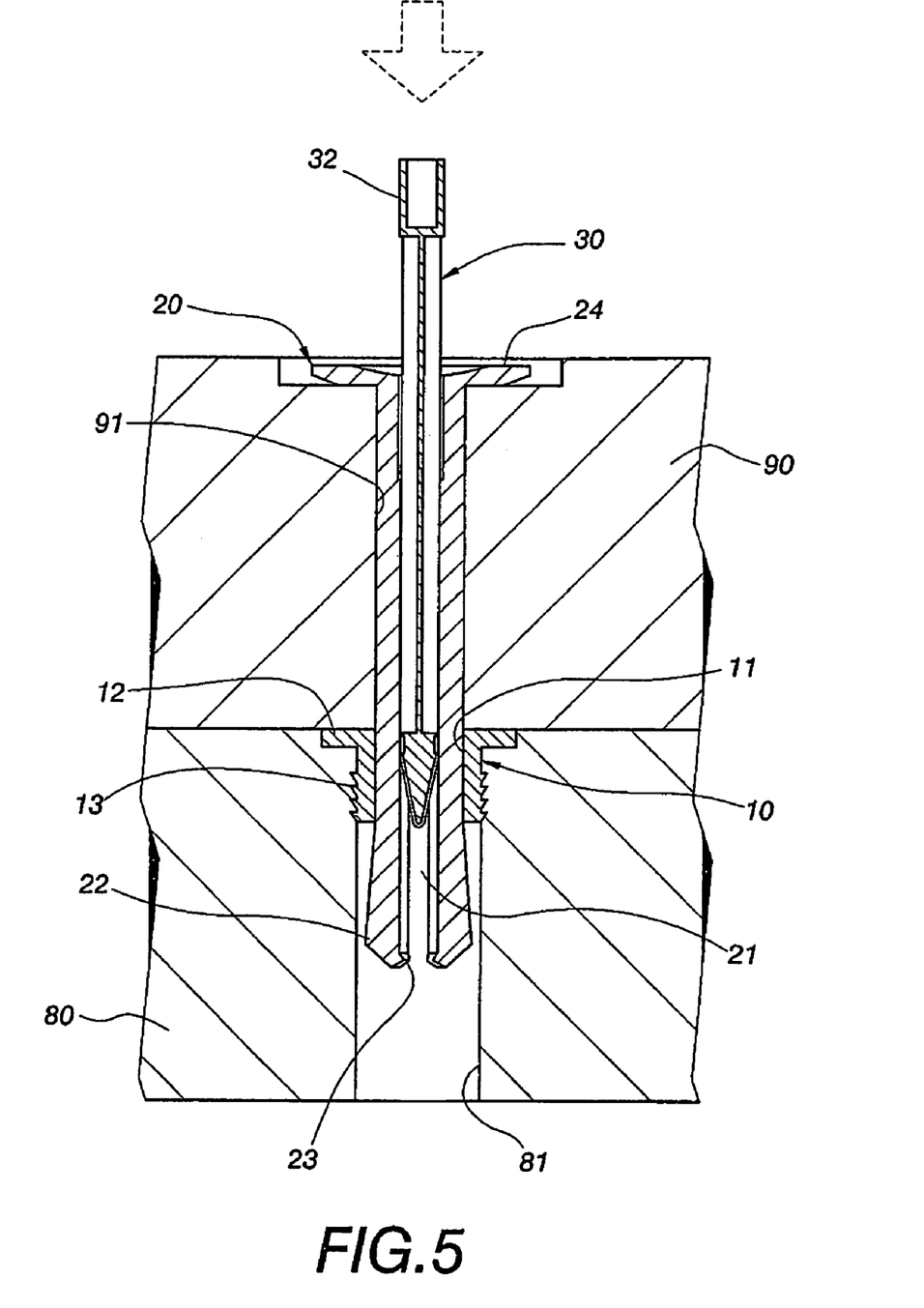
FIG. 5 is a schematic view of passing a passing rod into a latch element in accordance with the present invention.

In FIGS. 3 and 5, the passing rod 30 comes with a length greater than the depth of the through hole 21 for passing into the through hole 21 of the latch element 20, and the bottom portion includes a protruding lump 31 disposed on the internal flange 23 corresponding to the internal wall of the through hole 21. The external rim of the protruding lump 31 is provided for pressing and propping the internal flange 23. To prevent the passing rod 30 from dropping out from the through hole 21 when the latch element 20 is passed, the top of the passing rod 30 has a nut head 32 with an external diameter greater than the diameter of the through hole 21, and the top of the through hole 21 has a containing groove 25 corresponding to the nut head 32 for containing the nut head 32.

In FIGS. 4 and 5, if it is necessary to install and fix the board 90 onto the base body 80, the fixing element 10 is embedded and fixed into the first fixing hole 81 of the base body 80 as described above, and then the board 90 is stacked onto the base body 80, such that the second fixing hole 91 of the board 90 is aligned with the top and bottom of the fixing element 10.

Now, the latch element 20 is passed through the second fixing hole 91 of the board 90, and the claw-shaped latch portion 22 is passed through the latch hole 11 of the fixing element 10 downward until the latch portion 22 is situated under the fixing element 10. Since the latch portion 22 is claw-shaped and elastic, and its external diameter is greater than the diameter of the latch hole 11 of the fixing element 10, therefore when the latch portion 22 is passed into the latch hole 11, the latch portion 22 is elastically retracted, and when the latch portion 22 is displaced under the fixing element 10 and elastically extended outward, the latch portion 22 constitutes a temporary latch condition with the fixing element 10.

Figure 6:
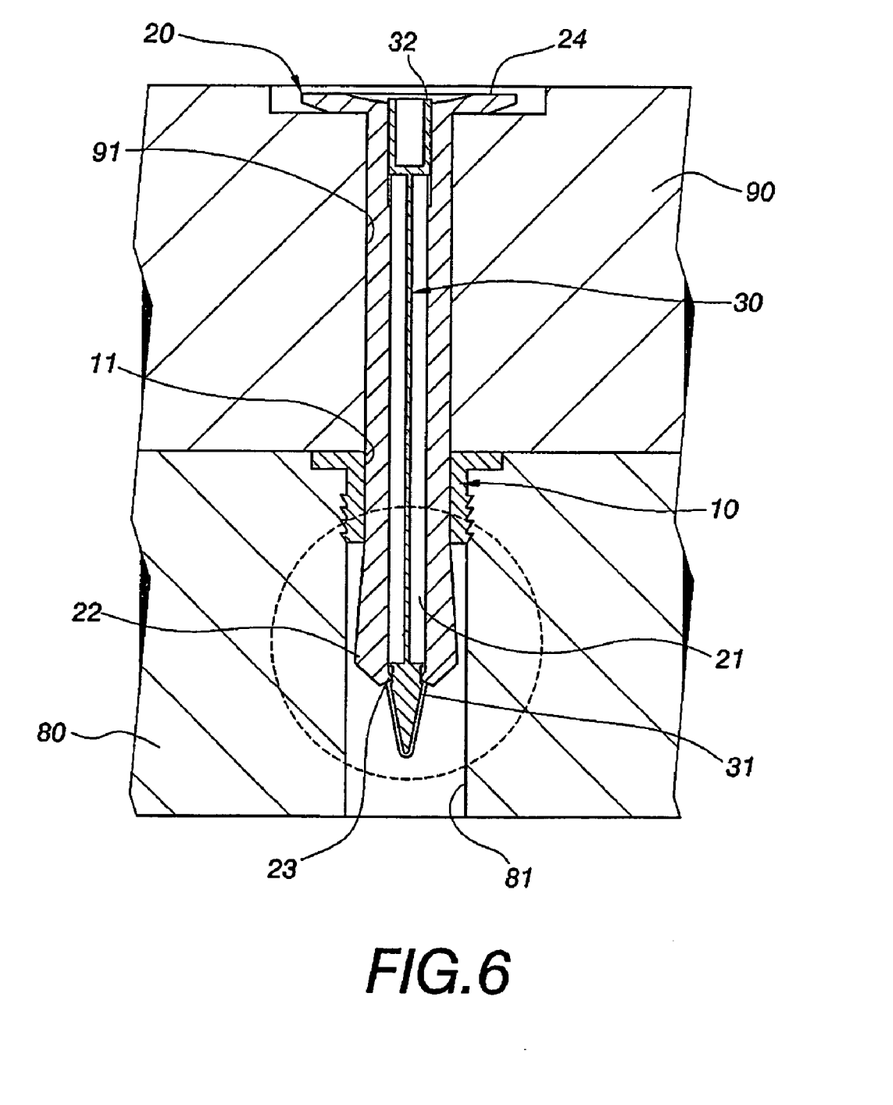
FIG. 6 is a schematic view of passing a passing rod to a fixed position in accordance with the present invention.

In FIGS. 5 and 6, after the latch element 20 is passed through the board 90 and temporarily latched with the fixing element 10, the passing rod 30 is passed through the through hole 21 of the latch element 20, until the external rim of the protruding lump 31 at the bottom portion of the passing rod 30 presses and props the internal flange 23. Since the internal flange 23 is disposed at the position corresponding to the latch portion 22 and protruded from the internal wall of the through hole 21, therefore the latch portion 22 is restricted from being retracted when the external rim of the protruding lump 31 presses and props at the internal flange 23. Further, the latch portion 22 having an external diameter greater than the diameter of the latch hole 11 of the fixing element 10 is maintained under the fixing element 10 and cannot be taken out, so that the board 90 is latched at the fixing element 10 by the latch element 20 and fixed onto the base body 80.

Figure 7:
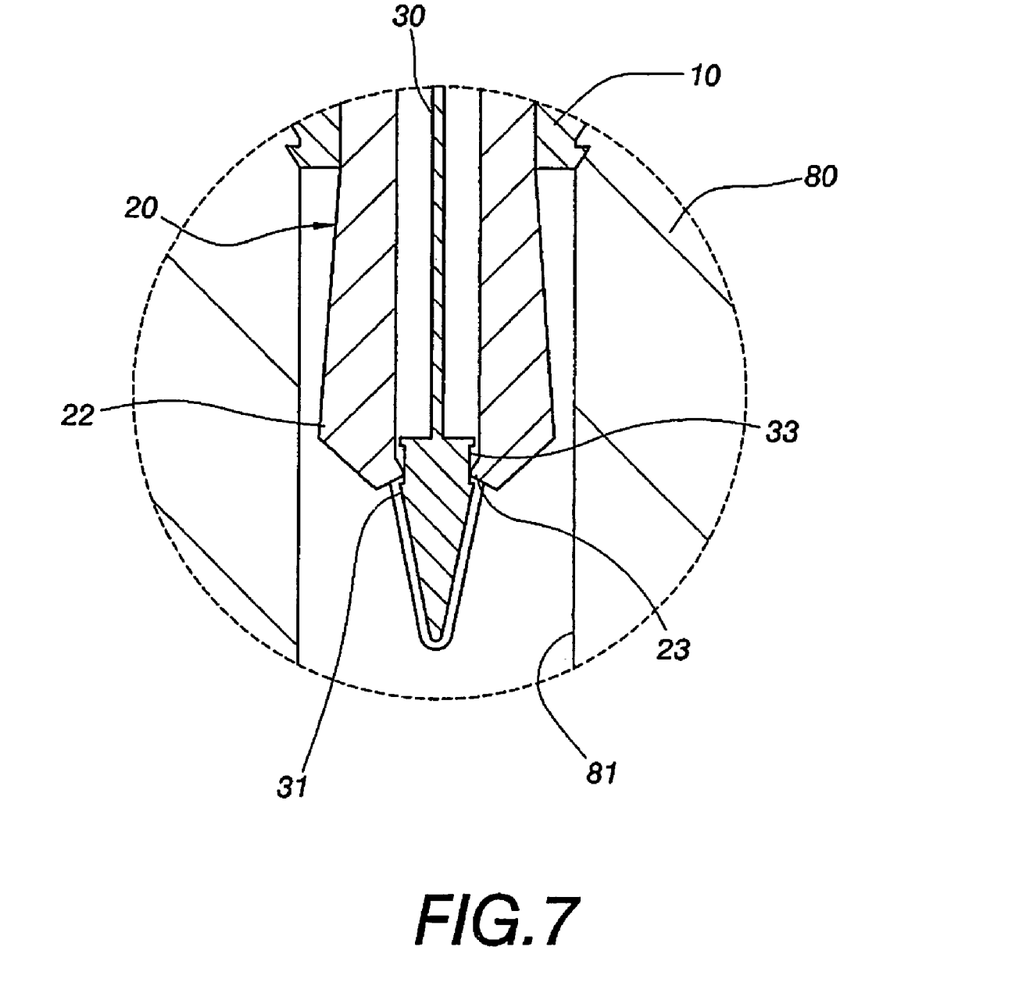
FIG. 7 is an enlarged view of a portion of FIG. 6.

In FIGS. 6 and 7, the external rim of the protruding lump 31 has a latch groove 33 for providing users a latch feeling when the passing rod 30 is passed through the through hole 21 of the latch element 20 to a fixed position. When the external rim of the protruding lump 31 at the bottom portion of the passing rod 30 is pressed and propped at the internal flange 23, the external rim is latched into the latch groove 33 to define a height difference, so that users can feel that the passing rod 30 has been displaced to the desired fixed position.

Figure 8:
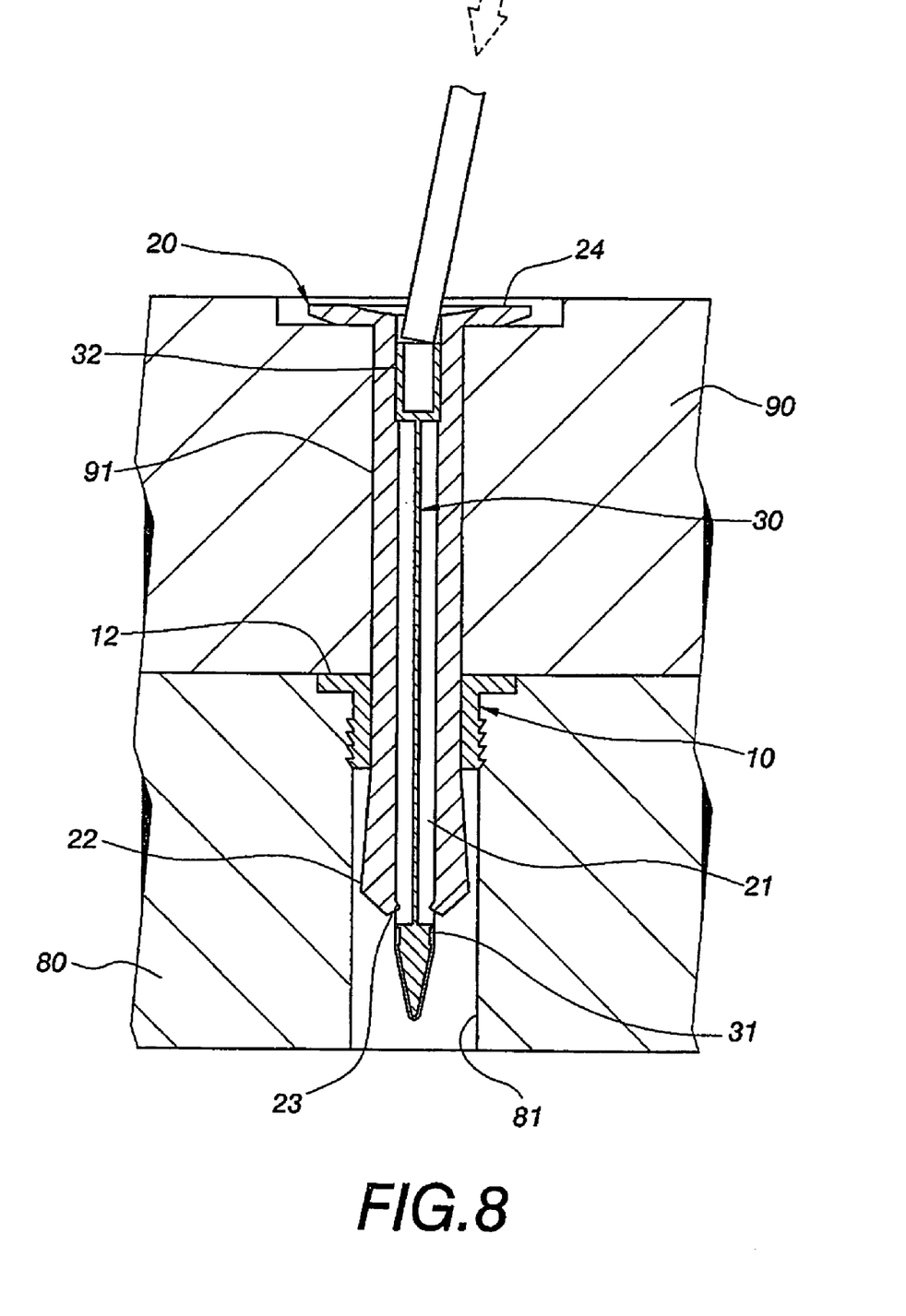
FIG. 8 is a schematic view of removing a board from a base body in accordance with the present invention.
Figure 9:
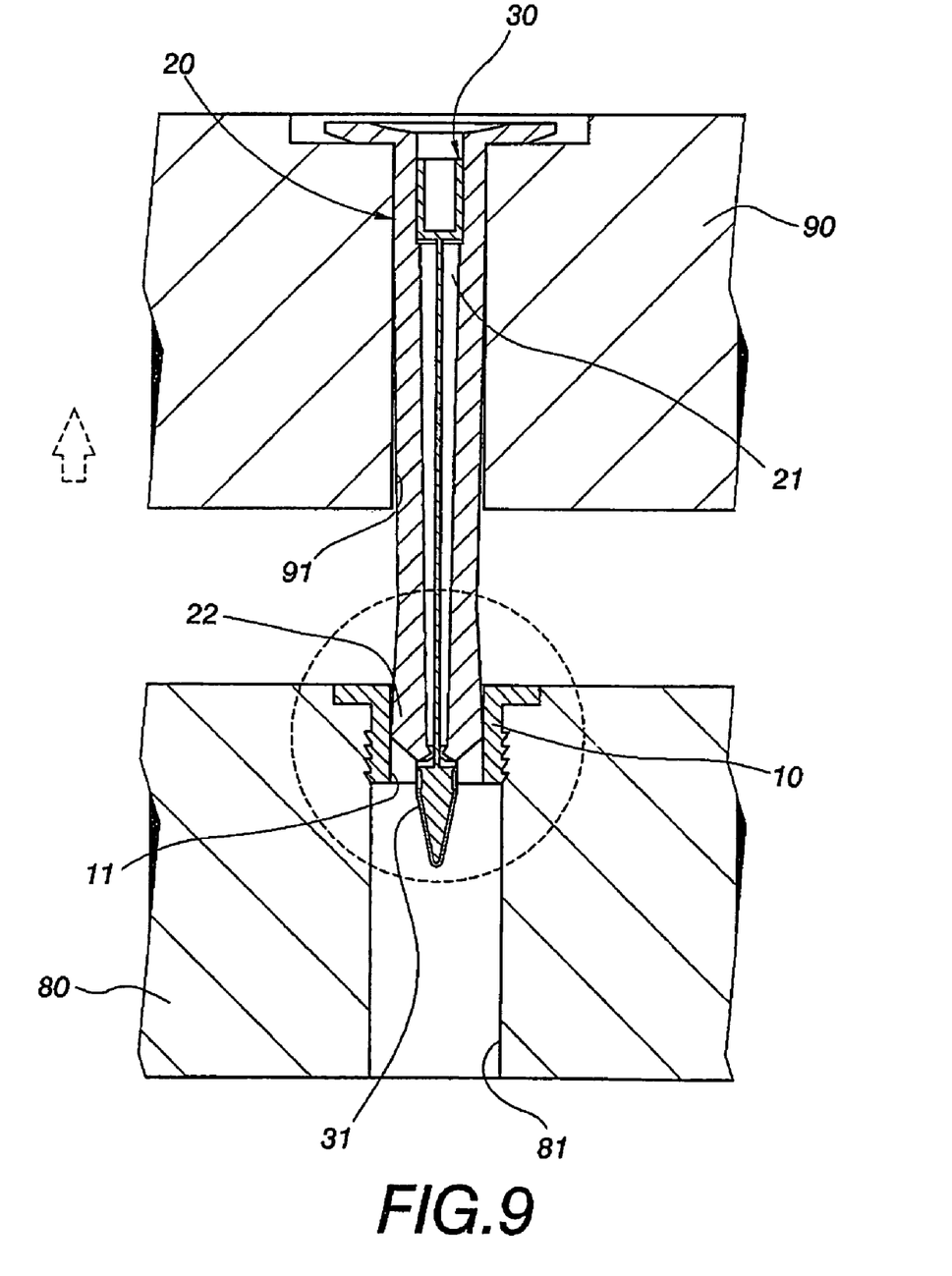
FIG. 9 is a schematic view of detaching a latch element from a fixing element in accordance with the present invention.
Figure 10:
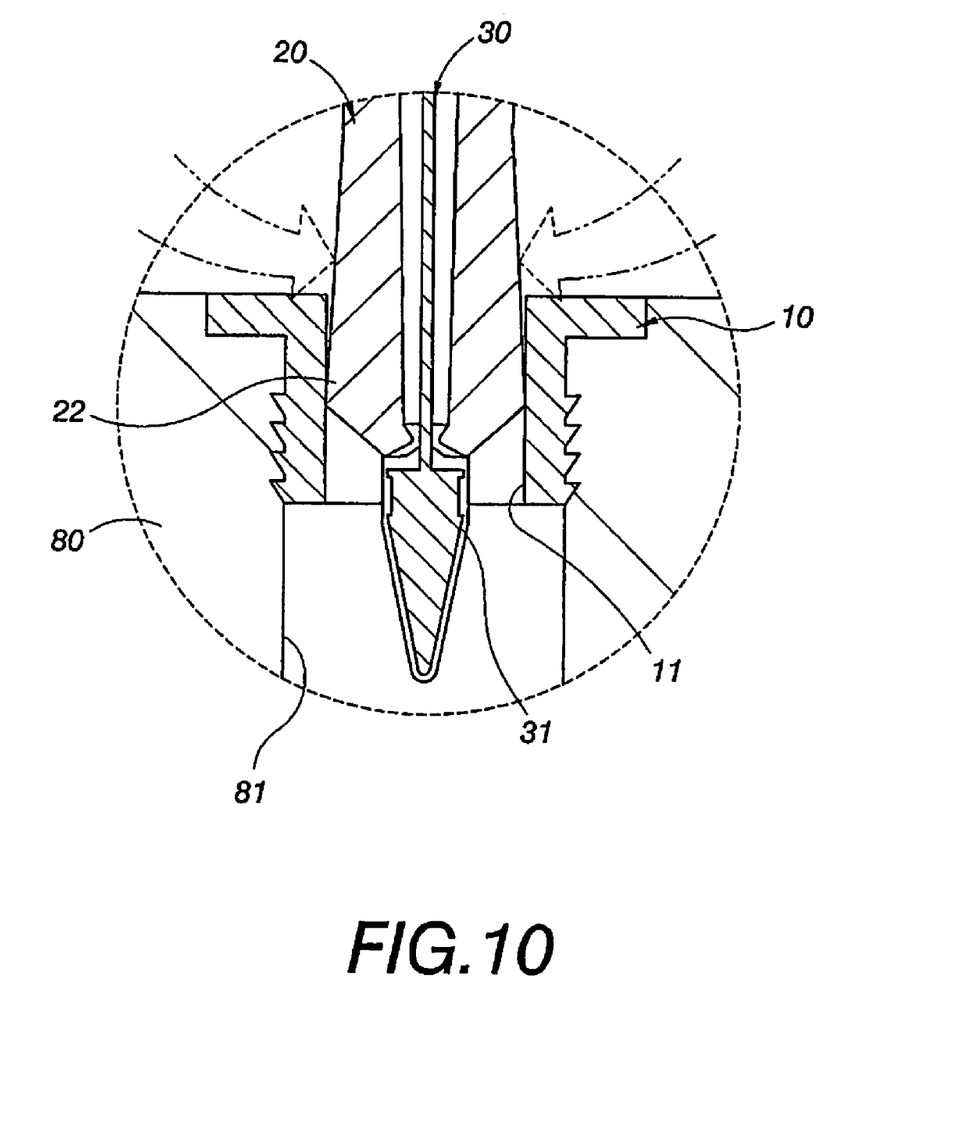
FIG. 10 is an enlarged view of a portion of a latch element being detached in accordance with the present invention.

In FIGS. 8 to 10, if it is necessary to remove the board 90 from the base body 80, users simply need to press the passing rod 30 down, such that after the protruding lump 31 is passed through the internal flange 23 of the latch element 20, the internal flange 23 of the latch portion 22 no longer props the protruding lump 31, and thus the latch portion 22 resumes its elastically retracted state, and the latch element 20 can be pulled out from the top of the latch hole 11 of the fixing element 10 to release the latch condition of the latch element 20 with the fixing element 10 in order to separate the board 90 from the base body 80. In other words, users simply need to press the passing rod 30 down to separate the board 90 from the top surface of the base body 80. Obviously, the invention provides a very convenient operation.

In this embodiment, the length of the passing rod 30 is preferably designed in a way that the top of the passing rod 30 is precisely and evenly aligned with the top of the latch element 20 when the passing rod 30 is passed into the protruding lump 31 and its external rim is propped at the internal flange 23. Therefore, users can use a finger to pass the passing rod 30 into a fixed position. In addition to the latch feeling, the top of the passing rod 30 is aligned precisely and evenly with the top of the latch element 20 and the passing rod 30 cannot be pressed any further to prevent any unintended movement of the passing rod 30. With the aforementioned latch state, the top of the passing rod 30 is aligned evenly with the top of the latch element 20, such that during the dismount as shown in FIG. 8, a rod is pressed down at the top of the passing rod 30 to pull the latch element 20 out from the latch hole 11 of the fixing element 10 without requiring any screwdriver or tool.

In summation of the description above, when a user wants to fix the board 90 to the base body 80, the user simply needs to align the second fixing hole 91 of the board 90 with the fixing element 10 of the base body 80, and passes the latch element 20 through the second fixing hole 91 and the fixing element 10, and then passes the passing rod 30 into the latch element 20 to latch the board 90 at the fixing element 10 and fix the board 90 onto the base body 80 by the latch element 20 and the passing rod 30. When the user wants to remove the board 90 from the base body 80, the user simply needs to press the top of the passing rod 30 downward to separate the board 90 from the base body 80. The invention provides the effect of a convenient installation or dismount and prevents the structure of the product from being damaged during repeated installations and dismounts.

While the invention is described in some detail hereinbelow with reference to certain illustrated embodiments, it is to be understood that there is no intent to limit the invention to those embodiments. On the contrary, the aim is to cover all modifications, alternatives and equivalents falling within the spirit and scope of the invention as defined by the appended claims.

What is claimed is:

1. A board fixing module, comprising:
    a base body having a first fixing hole formed therein;
    a fixing element embedded into the first fixing hole of the base body, the fixing element having a stop board extending around the periphery of the top of the fixing element for preventing the fixing element from passing through and dropping out of the first fixing hole;
    a board having a second fixing hole formed therein, the board abutting the base body such that the first and second fixing holes are aligned and the stop board is disposed between the base body and the board;
    a latch element having a bottom portion passing through the second fixing hole of the board for latching to the fixing element; and
    a passing rod passing into the latch element to cause the latch element to latch with the fixing element for securing the board to the base body,
    wherein the middle of the fixing element has a latch hole, the length of the latch element is greater than the length of the fixing element, the latch element is passed through the latch hole, and the middle of the latch element has a through hole axially penetrating the latch element,
    wherein the bottom portion of the latch element has an external diameter greater than a diameter of the latch hole of the fixing element, and after an elastically retractable claw-shaped latch portion of the latch element is passed through the latch hole, the claw-shaped latch portion is situated below the fixing element, and an internal wall around the periphery of the through hole has an internal flange disposed on the claw-shaped latch portion,
    wherein the passing rod is passed into the through hole of the latch element, and a bottom portion of the passing rod has a protruding lump disposed at an external edge and propped at the internal flange for restricting the claw-shaped latch portion from being retracted in a latched condition, and the length of the passing rod is greater than the depth of the through hole, such that when the passing rod is pressed such that the protruding lump is situated below the internal flange, the claw-shaped latch portion is elastically retracted to release the latched condition of the latch element and the fixing element.

2. The board fixing module of claim 1, wherein the first fixing hole defines a moving space below the fixing element that has an internal diameter greater than the diameter of the latch hole for containing the claw-shaped latch portion which has an external diameter greater than the diameter of the latch hole.

3. The board fixing module of claim 1, wherein the fixing element includes a plurality of serrations disposed on the external periphery of the fixing element and latched with the internal periphery of the first fixing hole.

4. The board fixing module of claim 1, wherein the latch element includes a nut rim disposed around the periphery of the top of the latch element and having an external diameter greater than the diameter of the second fixing hole for preventing the latch element from passing through or dropping out of the second fixing hole.

5. The board fixing module of claim 1, wherein the passing rod includes a nut head disposed at the top of the passing rod and having an external diameter greater than the diameter of the through hole, and the top of the through hole includes a containing groove corresponding to the nut head for containing the nut head.

6. The board fixing module of claim 1, wherein the protruding lump includes a latch groove disposed around the external periphery of the protruding lump, such that the external periphery of the protruding lump at the bottom portion of the passing rod is pressed against the internal flange to latch the internal flange in the latch groove.

7. The board fixing module of claim 1, wherein the passing rod has its top aligned precisely with the latch element when the external edge of the protruding lump presses against the internal flange.

* * * * *